United States Patent
Chen

[19]

[11] Patent Number: 6,127,920
[45] Date of Patent: Oct. 3, 2000

[54] CAR LOCATION INDICATING AND BURGLARPROOF ALARM DEVICE

[76] Inventor: Chung-Yang Chen, 3F, No. 2, Lane 497, Chung-Cheng Rd., Hsintien City, Taipei County, Taiwan

[21] Appl. No.: 09/376,497

[22] Filed: Aug. 18, 1999

[51] Int. Cl.$^7$ ...................................................... B60Q 1/00
[52] U.S. Cl. ........................ 340/425.5; 340/426; 340/429; 340/539; 340/540; 340/566
[58] Field of Search .................................... 340/426, 429, 340/425.5, 539, 540, 546, 545.5, 545.3; 180/287; 307/10.2

[56] References Cited

U.S. PATENT DOCUMENTS

| | | | |
|---|---|---|---|
| 4,665,397 | 5/1987 | Pinnow | 340/825.56 |
| 5,278,556 | 1/1994 | Oh | 340/988 |
| 5,463,371 | 10/1995 | Fuller | 340/426 |
| 5,469,151 | 11/1995 | Lavelle et al. | 340/825.36 |
| 5,677,664 | 10/1997 | Sawinski | 340/426 |
| 5,739,747 | 4/1998 | Flick | 340/426 |
| 5,828,317 | 10/1998 | Togashi | 340/825.69 |
| 5,952,933 | 9/1999 | Issa et al. | 340/825.31 |

*Primary Examiner*—Jeffery A. Hofsass
*Assistant Examiner*—Hung Nguyen
*Attorney, Agent, or Firm*—Dougherty & Troxell

[57] ABSTRACT

A car location indicating and burglarproof alarm device including a main frame and a portable controller. The main frame includes a central processing/controlling unit, a signal receiving unit, a shock sensor, an indicator and an alarm unit. The main frame is equipped with a clip member enabling a user to easily mount the main frame on a sunshade or instrument panel of the car by way of clipping. The portable controller includes a microprocessing unit, a signal transmitting unit and a key pad unit. The portable controller is used to remotely control and activate or turn off the burglarproof alarm of the main frame. When a user via the key pad unit of the portable controller gives the main frame a command of activation, the signal receiving unit of the main frame receives the signal transmitted from the portable controller and sends the signal to the central processing/controlling unit for processing. The central processing/controlling unit will activate the shock sensor to sense the abnormal situations of the car body. In the case of shaking, collision or intrusion, the shock sensor will immediately send the abnormal information to the central processing/controlling unit. After receiving the information, the central processing/controlling unit will activate the indicator to emit strong light or activate the alarm unit to emit alarming sound. In addition, the portable controller can remotely control the indicator to emit strong light or the alarm unit to emit indicating sound so as to help a user in finding the location of the car.

6 Claims, 4 Drawing Sheets

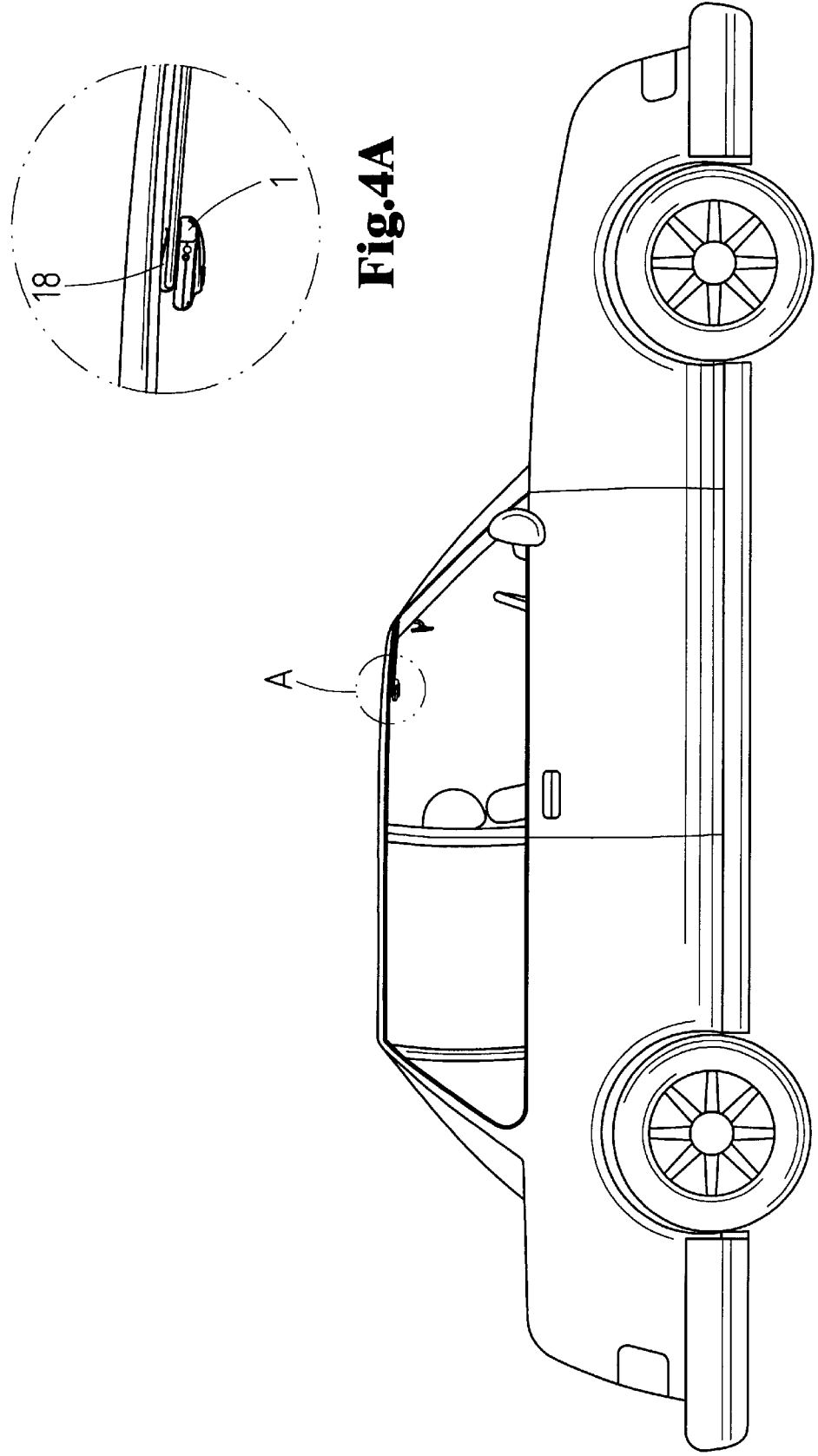

CAR LOCATION INDICATING AND BURGLARPROOF ALARM DEVICE

BACKGROUND OF THE INVENTION

The present invention relates to a car location indicating and burglarproof alarm device, and more particularly to a car-used burglarproof alarm device which is designed as a main frame with a simple pattern. The main frame is equipped with a clip member enabling a user to easily mount the main frame on a sunshade or instrument panel of the car by way of clipping. A user can operate a portable controller to easily control the burglarproof alarm. Therefore, the shortcomings of the conventional car-used burglarproof alarm, that is, layout of complicated wires and drilling operation are eliminated. An indicator is additionally disposed on the car body, which can flicker under remote control of the portable controller so as to help in finding the location of the car.

A conventional car-used burglarproof device includes a control box and a remote controller. The control box is installed on the car body and a user via the remote controller activates or turns off the burglarproof device. In the case that the car body is shook, shocked or intruded, the burglarproof device according to the signal of a sensor activates an alarm to emit alarm sound and inform the user of the intrusion or shock.

In practical use, the above car-used burglarproof device has some shortcomings as follows:

1. The complicated wires of the car-used burglarproof device must be one by one mounted on the main circuit of the car by a specialist. In addition, only by means of drilling or embedding of the wires, the control box can be fixed in the car. Such installation is time-consuming and inconvenient.
2. The respective wires of the car-used burglarproof device are connected with the main circuit of the car body and the car-used burglarproof device is powered by the battery of the car. Therefore, under the condition that the burglarproof device is activated while the car is not started, the load on the battery will be increased and the discharging of the battery will be speeded. As a result, it will be difficult or even impossible to start the car and the battery will need to be replaced by a new one.

On the other hand, the conventional car-used burglarproof device often has an additional car-searching function. The car-used burglarproof device is electrically connected with the head light, light set or the horn of the car. Under a circumstance of poor illumination or complicated environment, a user can use the remote controller to control a receiver on the car body, which turns on the head light, light set or horn to flicker or intermittently emit sound for helping in locating the car. In order to achieve the above function, the wires of the burglarproof device must be laid in the car in a complicated manner. Moreover, in the case that the car is parked among a number of cars and the head light of the car is positioned at a relatively low position, the location of the car will be difficult to find.

SUMMARY OF THE INVENTION

It is therefore a primary object of the present invention to provide a car location indicating and burglarproof alarm device including a main frame and a portable controller. The main frame is equipped with a clip member enabling a user to easily mount the main frame on a sunshade or instrument panel of the car by way of clipping. Therefore, the shortcomings of the conventional car-used burglarproof alarm, that is, layout of complicated wires and drilling operation are eliminated. The portable controller is used to remotely control and activate or turn off the burglarproof alarm of the main frame. When a user via the portable controller gives the main frame a command of activation, a built in shock sensor of the main frame will sense the abnormal situations of the car body. In the case of shaking, collision or intrusion, the shock sensor will immediately send the abnormal information to a central processing/controlling unit which will activate an indicator to emit strong light or activate the alarm unit to emit alarming sound. By means of the light and alarming sound, the user can be clearly indicated of the situation and location of the car.

It is a further object of the present invention to provide the above car location indicating and burglarproof alarm device in which the main frame is installed at a higher position in the car. Via a key pad of the portable controller, a user can directly remotely control the main frame to activate the indicator to intermittently emit strong light or activate the alarm unit to emit alarming sound so as to effectively help a user in finding the location of the car in a complicated or dim environment.

The present invention can be best understood through the following description and accompanying drawings wherein:

BRIEF DESCRIPTION OF THE DRAWINGS

FIG. 4 shows that the main frame of the present invention is installed at a higher position in the car.

FIG. 4A is an enlarged view of area A in FIG. 4.

DETAILED DESCRIPTION OF THE PREFERRED EMBODIMENT

Figure 1:
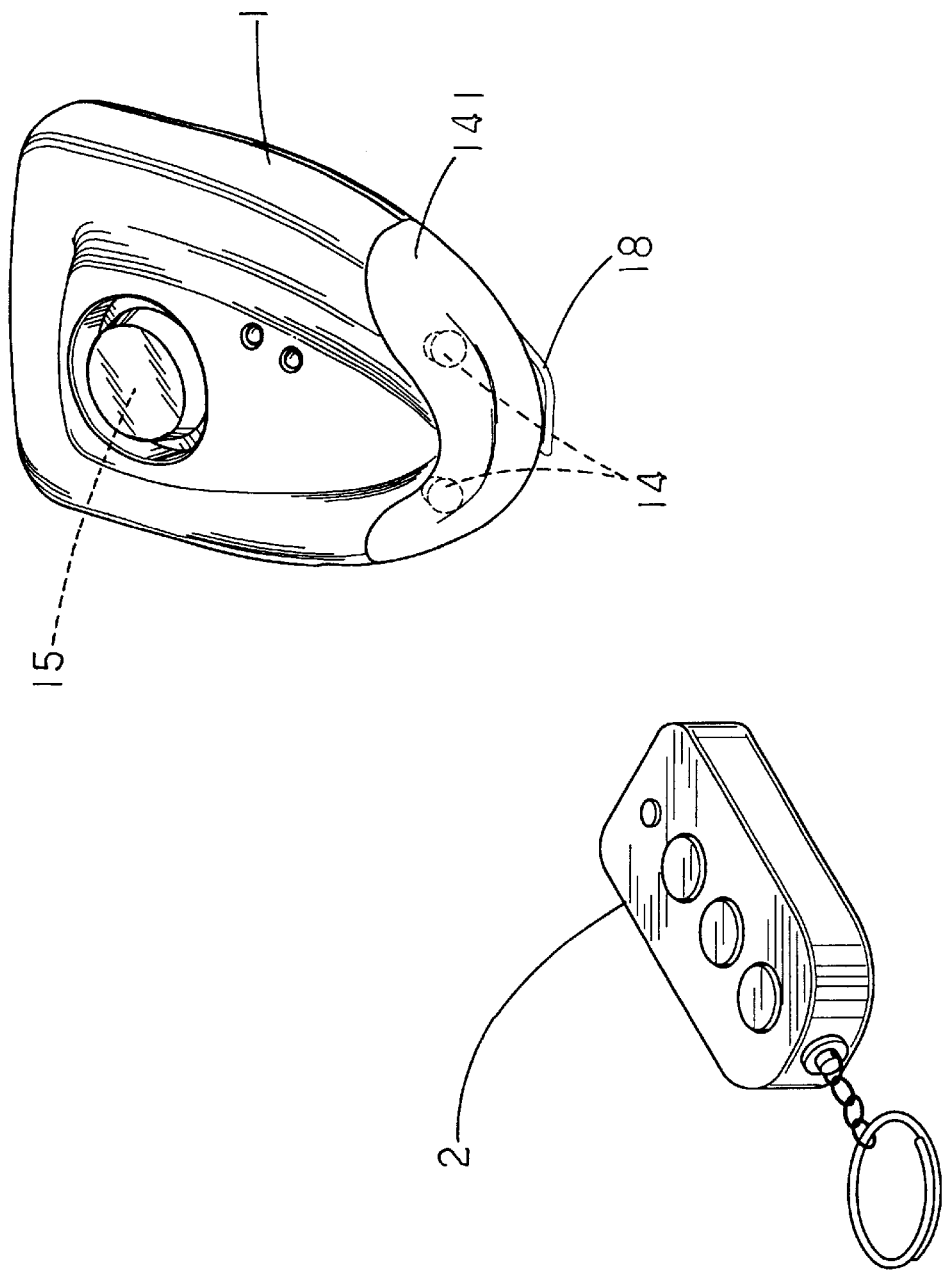
FIG. 1 is a perspective view of the main frame and portable controller of the present invention.
Figure 2:
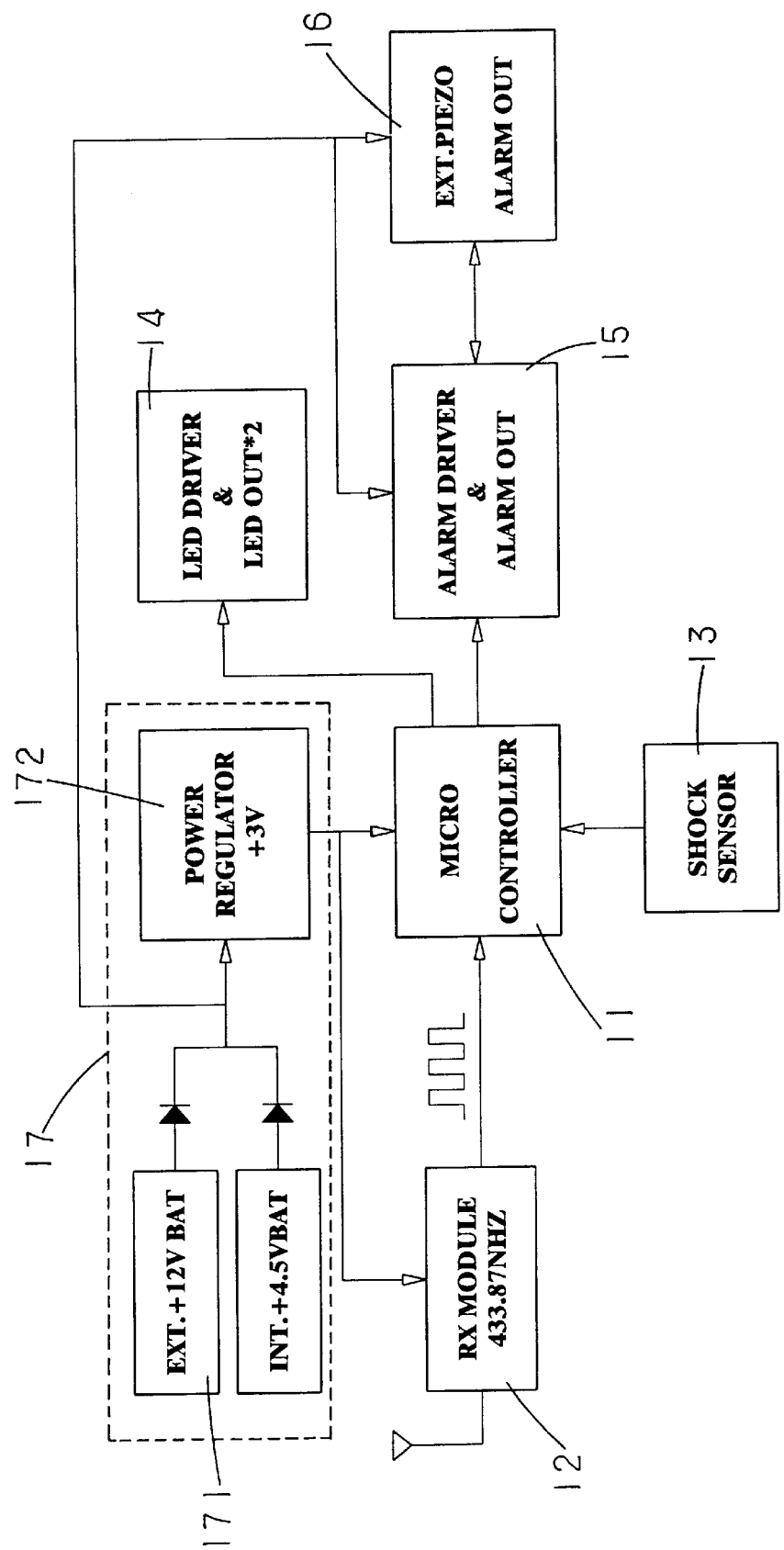
FIG. 2 is a block circuit diagram of the main frame of the present invention.
Figure 3:
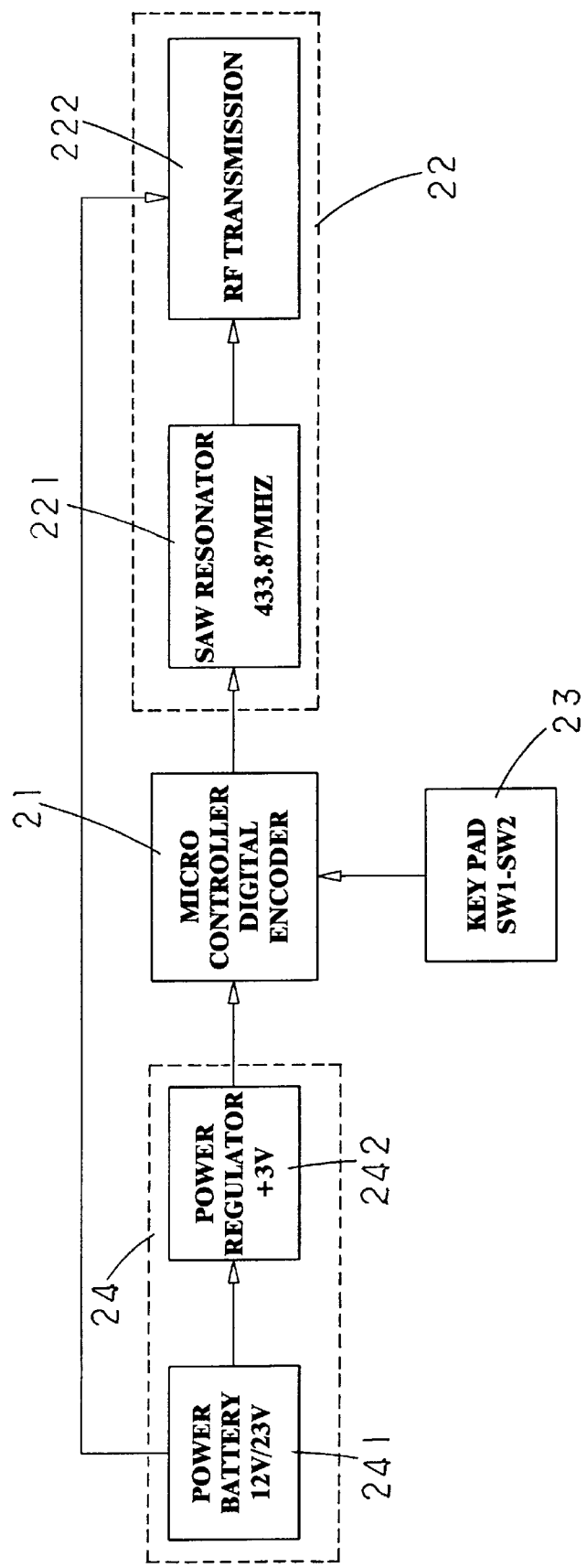
FIG. 3 is a block circuit diagram of the portable controller of the present invention.

Please refer to FIGS. 1 to 4. The present invention is composed of a main frame 1 and a portable controller 2. The main frame 1 includes a central processing/controlling unit 11, a signal receiving unit 12, a shock sensor 13, an indicator 14 and an alarm unit 15. The main frame 1 is equipped with a clip member 18 enabling a user to easily mount the main frame 1 on a sunshade or instrument panel of the car by way of clipping. The portable controller 2 includes a microprocessing unit 21, signal transmitting unit 22 and a key pad unit 23. The portable controller 2 is used to activate or turn off the burglarproof alarm of the main frame 1. When a user via the key pad unit 23 of the portable controller 2 gives the main frame 1 a command of activation or turning off, the microprocessor 21 of the portable controller 2 further processes the signal transmitted by the key pad unit 23 and determines the code previously set for activating or turning off the burglarproof alarm. The code is further transformed by the signal transmitting unit 22 and transmitted to the main frame 1. The signal transmitting unit 22 is composed of an audiofrequency controller 221 and a radio transmission unit 222. After the microprocessor 21 sends the code to the audiofrequency controller 221, through frequency oscillation thereof, the code is transmitted by the radio transmission unit 222 to be received by the main frame 1. After the signal receiving unit 12 of the main frame 1 receives the signal transmitted from the portable controller 2, the signal is sent to the central processing/controlling unit 11 for processing. In the case of activation command, the central processing/controlling unit 11 will activate the shock sensor 13 which serves to sense the abnormal situations of the car body, such as shaking, collision or intrusion. The shock sensor 13 also is able to immediately send the abnormal information to the central processing/controlling unit 11. After receiving the information, the central processing/controlling unit 11 will activate the indicator 14 to emit strong light or activate the alarm unit 15 to emit sound or even through an externally connected horn 16 on outer side of the car, the alarm unit 15 can emit more apparent alarming sound. By means of the alarming sound or flickering light, those persons around the car can be informed of the abnormal situations and the location of the car. The externally connected horn 16 is mounted at an external position of the car by way of laying the wire so as to enhance the volume of the alarm sound. In addition, the indicator 14 of the present invention includes high illumination bulbs mounted in a transparent cover 141 of the main frame 1. Via the key pad unit 23 of the portable controller 2, the indicator 14 can be activated by the main frame 1 in the car to emit strong light or the alarm unit 15 can be activated to emit alarming sound so as to indicate the user of location of the car. This is very helpful in searching the car in a complicated or dim environment. Moreover, the main frame 1 is powered by a power source 17 for activating and maintaining the functions thereof. The power source 17 includes several batteries 171 and a stabilizing circuit 172 for rectifying and supplying power for the main frame 1. The portable controller 2 is also powered by a power source 24 for maintaining the functions thereof. The power source 24 includes several batteries 241 and a stabilizing circuit 242 for rectifying and supplying power for the portable controller 2.

According to the above arrangement, the car location indicating and burglarproof alarm device of the present invention can achieve double effects in a simple pattern. Therefore, the shortcomings of the conventional car-used burglarproof alarm and location indicating device, that is, complicated wires must be embedded in the car and a drilling operation is necessitated are eliminated.

The above embodiment is only used to illustrate the present invention, not intended to limit the scope thereof. Many modifications of the above embodiment can be made without departing from the spirit of the present invention.

What is claimed is:

1. A car location indicating and burglarproof alarm device comprising a main frame and a portable controller, wherein said main frame includes:

a central processing/controlling unit controlled by a signal transmitted from the portable controller which activates or turns off circuit devices connected with the central processing/controlling unit;

a signal receiving unit connected with the central processing/controlling unit for receiving the signal transmitted from the portable controller and immediately sending the signal to the central processing/controlling unit for processing;

a shock sensor connected to and controlled by the central processing/controlling unit for sensing abnormal situations of the car, such as shaking, collision or intrusion and immediately sending the information of the abnormal situations to the central processing/controlling unit;

an indicator having a transparent cover covering high illumination bulbs, the indicator connected to and controlled by the central processing/controlling unit for emitting a bright indicating light;

an alarm unit connected to and controlled by the central processing/controlling unit for emitting an alarming sound, whereby the indicator may be actuated by the portable controller separately from the alarm unit for locating the car; and, a clip member on the main frame enabling a user to easily mount the main frame on a sunshade or instrument panel of the car by way of clipping.

2. The car location indicating and burglarproof alarm device as claimed in claim 1, wherein the alarm unit further comprises an externally connected horn on an outer side of the car, whereby the externally connected horn can emit an alarming sound.

3. The car location indicating and burglarproof alarm device as claimed in claim 2, wherein the portable controller includes a microprocessing unit, signal transmitting unit and a key pad unit, whereby via the key pad unit, a user can give the main frame a command signal for activating or turning off the burglarproof alarm or the indicator, the microprocessor further processing the signal transmitted by the key pad unit and comparing the signal to a previously set code for activating or turning off the burglarproof alarm, the code being further transformed by the signal transmitting unit and transmitted to the main frame.

4. The car location indicating and burglarproof alarm device as claimed in claim 3, wherein the signal transmitting unit comprises an audiofrequency controller and a radio transmission unit, whereby after the microprocessor sends the code to the audiofrequency controller, through frequency oscillation thereof, the code is transmitted by the radio transmission unit to be received by the main frame.

5. The car location indicating and burglarproof alarm device as claimed in claim 1, wherein the portable controller comprises a microprocessing unit, signal transmitting unit and a key pad unit, whereby via the key pad unit, a user can give the main frame a command signal for activating or turning off the burglarproof alarm or the indicator, the microprocessor further processing the signal transmitted by the key pad unit and comparing the signal to a previously set code for activating or turning off the burglarproof alarm, the code being further transformed by the signal transmitting unit and transmitted to the main frame.

6. The car location indicating and burglarproof alarm device as claimed in claim 5, wherein the signal transmitting unit comprises an audiofrequency controller and a radio transmission unit, whereby after the microprocessor sends the code to the audiofrequency controller, through frequency oscillation thereof, the code is transmitted by the radio transmission unit to be received by the main frame.

\* \* \* \* \*